United States Patent
Newbound et al.

(10) Patent No.: US 11,522,178 B2
(45) Date of Patent: Dec. 6, 2022

(54) PASSIVATED PRE-LITHIATED MICRON AND SUB-MICRON GROUP IVA PARTICLES AND METHODS OF PREPARATION THEREOF

(71) Applicant: KRATOS LLC, Lexington, SC (US)

(72) Inventors: Timothy D. Newbound, Chelsea, MI (US); Reza Kavian, Chelsea, MI (US); Jeff A. Norris, Lexington, SC (US)

(73) Assignee: KRATOS LLC, Irmo, SC (US)

( * ) Notice: Subject to any disclaimer, the term of this patent is extended or adjusted under 35 U.S.C. 154(b) by 496 days.

(21) Appl. No.: 16/311,988

(22) PCT Filed: Jul. 3, 2017

(86) PCT No.: PCT/US2017/040605
§ 371 (c)(1),
(2) Date: Dec. 20, 2018

(87) PCT Pub. No.: WO2018/009484
PCT Pub. Date: Jan. 11, 2018

(65) Prior Publication Data
US 2019/0214642 A1 Jul. 11, 2019

Related U.S. Application Data

(60) Provisional application No. 62/479,444, filed on Mar. 31, 2017, provisional application No. 62/358,401, filed on Jul. 5, 2016.

(51) Int. Cl.
*H01M 4/04* (2006.01)
*H01M 4/36* (2006.01)
(Continued)

(52) U.S. Cl.
CPC ......... *H01M 4/386* (2013.01); *H01M 4/0471* (2013.01); *H01M 4/366* (2013.01);
(Continued)

(58) Field of Classification Search
CPC .... H01M 4/0471; H01M 4/366; H01M 4/587; H01M 4/625; H01M 4/386
See application file for complete search history.

(56) References Cited

U.S. PATENT DOCUMENTS

| 4,626,335 A | 12/1986 | Cupp et al. |
| 5,518,187 A | 5/1996 | Bruno et al. |

(Continued)

FOREIGN PATENT DOCUMENTS

| CN | 1891668 A | 1/2007 |
| CN | 102208617 A | 10/2011 |

(Continued)

OTHER PUBLICATIONS

Appetecchi et al., "Synthesis of Hydrophobic Ionic Liquids for Electrochemical Applications," Journal of The Elecrochemical Society, 2006, 153(9) A1685-A1691.

(Continued)

*Primary Examiner* — Ula C Ruddock
*Assistant Examiner* — Frank A Chernow
(74) *Attorney, Agent, or Firm* — Michael Best & Friedrich LLP

(57) ABSTRACT

A method of producing a negative electrode, including comminuting Li-Group IVA alloy particles in a solvent to a desired particle size distribution range, exposing surfaces of the Li-Group IVA alloy particles to at least one surface modifier present during the comminution process, the at least one surface modifier forming at least one continuous coating on at least one of the exposed surfaces of the Li-Group IVA alloy particles, removing the solvent, and adding the surface-modified Li-Group IVA alloy particles to a negative electrode material by a coating process.

16 Claims, 5 Drawing Sheets

(51) Int. Cl.
*H01M 4/38* (2006.01)
*H01M 4/587* (2010.01)
*H01M 4/62* (2006.01)
*H01M 4/02* (2006.01)

(52) U.S. Cl.
CPC ............ *H01M 4/38* (2013.01); *H01M 4/387* (2013.01); *H01M 4/587* (2013.01); *H01M 4/625* (2013.01); *H01M 2004/027* (2013.01)

(56) References Cited

U.S. PATENT DOCUMENTS

| | | |
|---|---|---|
| 5,541,022 A | 7/1996 | Mizumoto et al. |
| 6,132,801 A | 10/2000 | Linford |
| 6,221,941 B1 | 4/2001 | Strauss et al. |
| 6,268,041 B1 | 7/2001 | Goldstein |
| 6,841,079 B2 | 1/2005 | Dunbar et al. |
| 6,855,204 B2 | 2/2005 | Kauzlarich |
| 7,008,722 B2 | 3/2006 | Huang |
| 7,507,502 B2 | 3/2009 | Kojima et al. |
| 7,531,155 B2 | 5/2009 | Li |
| 7,588,623 B2 | 9/2009 | Dover et al. |
| 7,588,862 B2 | 9/2009 | Dasgupta et al. |
| 7,838,147 B2 | 11/2010 | Kawase et al. |
| 7,883,995 B2 | 2/2011 | Mitchell et al. |
| 8,071,238 B2 | 12/2011 | Le |
| 8,119,288 B2 | 2/2012 | Zhamu et al. |
| 8,216,719 B2 | 7/2012 | Yamada et al. |
| 8,658,062 B2 | 2/2014 | Kumta et al. |
| 8,673,490 B2 | 3/2014 | Kumar et al. |
| 8,834,746 B1 | 9/2014 | Stachwiak et al. |
| 9,231,243 B2 | 1/2016 | Cui et al. |
| 9,461,304 B2 | 10/2016 | Newbound et al. |
| 9,461,309 B2 | 10/2016 | Newbound et al. |
| 10,211,454 B2 | 2/2019 | Newbound et al. |
| 11,005,097 B2 | 5/2021 | Newbound et al. |
| 2003/0036000 A1* | 2/2003 | Mori .................. H01M 4/13 429/231.95 |
| 2004/0137327 A1 | 7/2004 | Gross et al. |
| 2005/0136330 A1 | 6/2005 | Mao et al. |
| 2006/0083986 A1 | 4/2006 | Li et al. |
| 2006/0133980 A1 | 6/2006 | Nanba et al. |
| 2006/0147369 A1 | 6/2006 | Bi et al. |
| 2006/0147797 A1 | 7/2006 | Wu et al. |
| 2007/0077490 A1 | 4/2007 | Kim et al. |
| 2007/0224508 A1 | 9/2007 | Aramata et al. |
| 2008/0026297 A1 | 1/2008 | Chen et al. |
| 2008/0248307 A1 | 10/2008 | Jurbergs et al. |
| 2009/0042102 A1 | 2/2009 | Cui et al. |
| 2009/0042136 A1 | 2/2009 | Tour et al. |
| 2009/0047773 A1 | 2/2009 | Mitchell et al. |
| 2009/0305131 A1 | 12/2009 | Kumar et al. |
| 2010/0062338 A1 | 3/2010 | Golightly et al. |
| 2010/0092868 A1 | 4/2010 | Kim et al. |
| 2010/0119942 A1 | 5/2010 | Kumar et al. |
| 2010/0120179 A1 | 5/2010 | Zhamu et al. |
| 2010/0139744 A1 | 6/2010 | Rogojina et al. |
| 2010/0148144 A1 | 6/2010 | Britton |
| 2010/0261050 A1 | 10/2010 | Kang et al. |
| 2011/0111303 A1 | 5/2011 | Kung et al. |
| 2011/0215280 A1 | 9/2011 | Obrovac et al. |
| 2011/0236753 A1 | 9/2011 | Kuriki et al. |
| 2011/0236754 A1 | 9/2011 | Kuriki et al. |
| 2011/0250348 A1 | 10/2011 | Mao et al. |
| 2011/0291240 A1 | 12/2011 | Yamazaki |
| 2012/0070736 A1 | 3/2012 | Ohara et al. |
| 2012/0121977 A1 | 5/2012 | Xu et al. |
| 2012/0205624 A1 | 8/2012 | Sargent et al. |
| 2012/0244391 A1 | 9/2012 | Yushin et al. |
| 2012/0275981 A1 | 11/2012 | Foord et al. |
| 2013/0004846 A1 | 1/2013 | Kim et al. |
| 2013/0039952 A1 | 2/2013 | Petersson |
| 2013/0045420 A1 | 2/2013 | Biswal et al. |
| 2013/0065116 A1 | 3/2013 | Ogihara et al. |
| 2013/0069601 A1 | 3/2013 | Coowar et al. |
| 2013/0089790 A1 | 4/2013 | Byon et al. |
| 2013/0136986 A1 | 5/2013 | Scoyer |
| 2013/0164612 A1 | 6/2013 | Tanemura et al. |
| 2013/0177820 A1 | 7/2013 | Kumta et al. |
| 2013/0184385 A1 | 7/2013 | Ogihara |
| 2013/0216907 A1 | 8/2013 | Rayner et al. |
| 2013/0221489 A1 | 8/2013 | Cao et al. |
| 2013/0260020 A1 | 10/2013 | Tomikawa et al. |
| 2013/0266865 A1 | 10/2013 | Kwon et al. |
| 2013/0288126 A1 | 10/2013 | Liu et al. |
| 2013/0295454 A1 | 11/2013 | Huang et al. |
| 2013/0302675 A1 | 11/2013 | Kouzu et al. |
| 2013/0323595 A1 | 12/2013 | Sohn et al. |
| 2014/0042390 A1 | 2/2014 | Gruner et al. |
| 2014/0050983 A1 | 2/2014 | Kim et al. |
| 2014/0057168 A1 | 2/2014 | Newbound et al. |
| 2014/0057179 A1 | 2/2014 | Yushin et al. |
| 2014/0106220 A1 | 4/2014 | Xiao et al. |
| 2014/0127573 A1 | 5/2014 | Xiao |
| 2014/0134499 A1 | 5/2014 | Newbound et al. |
| 2014/0205905 A1 | 7/2014 | Xiao et al. |
| 2014/0246398 A1 | 9/2014 | Zaghib et al. |
| 2014/0310951 A1 | 10/2014 | Grant et al. |
| 2015/0243973 A1 | 8/2015 | Newbound et al. |
| 2015/0263342 A1 | 9/2015 | Newbound et al. |
| 2016/0093879 A1 | 3/2016 | Song et al. |
| 2016/0164081 A1 | 6/2016 | Cui et al. |
| 2017/0149056 A1 | 5/2017 | Newbound et al. |
| 2017/0149066 A1 | 5/2017 | Newbound et al. |
| 2017/0338476 A1 | 11/2017 | Newbound et al. |
| 2019/0363349 A1 | 11/2019 | Newbound et al. |
| 2020/0044240 A1 | 2/2020 | Newbound et al. |
| 2020/0259170 A1 | 8/2020 | Newbound et al. |
| 2021/0013491 A1 | 1/2021 | Newbound et al. |

FOREIGN PATENT DOCUMENTS

| | | |
|---|---|---|
| CN | 102208632 A | 10/2011 |
| CN | 102544461 A | 7/2012 |
| CN | 102699334 B | 4/2013 |
| CN | 103474666 A | 12/2013 |
| DE | 4320140 A1 | 2/1994 |
| DE | 102009029054 A1 | 3/2011 |
| JP | 2005149946 A | 6/2005 |
| JP | 2007188868 A | 7/2007 |
| JP | 2008112710 A | 5/2008 |
| JP | 2010205686 A | 9/2010 |
| JP | 2010269972 A | 12/2010 |
| JP | 2011011928 A | 1/2011 |
| KR | 1020100038082 A | 4/2010 |
| KR | 1020100112442 A | 10/2010 |
| KR | 20160047301 A | 5/2016 |
| WO | WO2011060433 A1 | 5/2011 |
| WO | WO2014031780 A1 | 2/2014 |
| WO | WO2015127290 A1 | 8/2015 |

OTHER PUBLICATIONS

Baranchugov et al., "Amorphous silicon thin films as a high capacity anodes for Li-ion batteries in ionic liquid electrolytes," Electrochemistry Communications 9, 2007, 796-800.

Bates, J., et al., "Thin-film lithium and lithium-ion batteries," Solid State Ionics 2000, 135, pp. 33-45.

Biliae, A., et al., "Functionalization of semiconductor surfaces by organic layers: Concerted cycloaddition versus stepwise free radical reaction mechanisms," School of Chemistry The University of Sydney, 2006 (34 pages).

Bilic et al., "Functionalization of semiconductor surfaces by organic layers: Concerted cycloaddition versus stepwise free-radical reaction mechanism," Gruetter, Peter and Rosei, Federico and Hofer, W. (ed), Properties of single molecules on crystal surfaces, London: Imperial College Press (2006) downloaded from http://espace.library.curtin.edu.au/cgi-bin/espace.pdf?file=/2008/11/13/file_13/20114.

Buriak, "Organometallic Chemistry on Silicon and Germanium Surfaces," Chemical Reviews, 2002, vol. 102, Issue 5, pp. 1271-1308.

(56) References Cited

OTHER PUBLICATIONS

Chou et al., "Enhanced reversible lithium storage in nanosize silicon/graphene composite," Electrochemistry Communications 12, 2010, 303-306.

Cui, L., et al., "Carbon-silicon core-shell nanowires as high capacity electrode for lithium ion batteries," Nono Letters 2009, 9, pp. 3370-3374.

Cui, L., et al., "Crystalline-amorphous core-shell silicon nanowires for high capacity and high current battery electrodes," Nano Letters 2008, 9, pp. 491-495.

Cui, L., et al., "Light-weight free-standing carbon nanotube-silicon films for anodes of lithium ion batteries," Acs Nano 2010, 4, pp. 3671-3678.

Datta et al., "Amorphous silicon-carbon based nano-scale thin film anode materials for lithium ion batteries," Electrochimica Acta 2011, 56, 4717-4723.

Dudney et al., "Thin-film lithium and lithium-ion batteries," Solid State Ionics 135, 2000, 33-45.

Eom et al., "The design of a Li-ion full cell battery using a nano silicon and nano multi-layer graphene composite anode," Journal of Power Sources, 2013, pp. 119-124.

Gauthier et al. "A Low-cost and High Performance Ball-milled Si-based Negative Electrode for high-energy Li-ion batteries," Energy and Environmental Science, 2013, vol. 6, Issue 7, pp. 2145-2155.

Ge et al., "Review of porous silicon preparation and its application for lithium-ion battery anodes," Nanotechnology 24, 2013, 422001, pp. 1-10.

Ge et al., "Scalable preparation of porous silicon nanoparticles and their application for lithium-ion battery anodes," Nano Research, 2013, 6(3):174-181.

Hallmann et al., "Wetting properties of silicon films from alkyl-passivated particles produced by mechanochemical synthesis," Journal of Colloid and Interface Science 2010, 348, 634-641.

He et al., "A novel bath lily-like graphene sheet-wrapped nano-Si composite as high performance anode material for Li-ion batteries," RSC Advances, 2011, 1, 958-960.

Heintz et al., "Mechanochemical Synthesis of Blue Luminescent Alkyl/Alkenyl-Passivated Silicon Nanoparticles," Advanced Materials, 2007, 19, 3984-3988.

Hush et al., "Functionalization of semiconductor surfaces by organic layers: Concerted cycloaddition versus stepwise free-radical reaction" Gruetter, Peter and Rosei, Federico and Hofer, W. (ed), Properties of single molecules on crystal surfaces. 2006, London: Imperial College Press.

Ji et al., "Graphene/Si multilayer structure anodes for advanced half and full lithium-ion cells," Nano Energy, 2012, 1, 164-171.

Kasavajjula, U., et al., "Nano-and bulk-silicon-based insertion anodes for lithium-ion secondary cells," Journal of Power Sources 2007, 163, pp. 1003-1039.

Koo et al., "A Highly Cross-Linked Polymeric Binder for High-Performance Silicon Negative Electrodes in Lithium Ion Batteries," Angew. Chem. Int. Ed., 2012, 51, 8762-8767.

Kushima et al., "Quantitative Fracture Strength and Plasticity Measurements of Lithiated Silicon Nanowires by In Situ TEM Tensile Experiments," ACS Nano, 2012, vol. 6, No. 11, pp. 9425-9432.

Lee et al., "Effect of Randomly Networked Carbon Nanotubes in Silicon-Based Anodes for Lithium-Ion Batteries," Journal of the Electrochemical Society 2009, 156, A905-A910.

Lu et al., "Imparting functionality to a metal-organic framework material by controlled nanoparticle encapsulation", NatureChemistry, vol. 4, Apr. 2012, pp. 310-316.

Magasinski et al., "High-performance lithium-ion anodes using a hierarchial bottom-up approach," Nature Materials, 2010, vol. 9, pp. 353-358.

Maranchi, J., et al., "High capacity, reversible silicon thin-film anodes for lithium-ion batteries," Electrochemical and Solid-State Letters 2003, 6, pp. A198-A201.

McDowell et al., "25th Anniversary Article: Understanding the Lithiation of Silicon and Other Alloying Anodes for Lithium-Ion Batteries," Advanced Materials, 2013, 25, 4966-4985.

Park, M., et al., "Silicon nanotube battery anodes," Nano Letters 2009, 9, pp. 3844-3847.

Pharr et al., "Measurements of the Fracture Energy of Lithiated Silicon Electrodes of Li-Ion Batteries," Nano Letters, 2013, 13(11):5570-7.

Pinson et al., "Theory of SEI Formation in Rechargable Batteries: Capacity Fade, Accelerated Aging and Lifetime Prediction," Journal of The Electromechanical Society, 2013, 160(2):A243-A250.

Regents of the University of Minnesota, Dept. of Physics & Astronomy, "A Metastable Initial State in Benzene Adsorption," 1998.

Regents of the University of Minnesota, Dept. of Physics & Astronomy, "An STM study of the adsorption of toluene on Si(001)," 1998.

Reindl et al., "Dispersing and stabilizing silicon nanoparticles in a low-epsilon medium," Colloids and Surfaces a-Physicochemical and Engineering Aspects 2008, 320, 183-188.

Reindl et al., "Dispersing silicon nanoparticles with a stirred media mill and subsequent functionalization with phenyl acetylene," Colloids and Surfaces A: Physicochemical and Engineering Aspects 2007, 301, 382-387.

Ren et al., "Silicon-Graphene Composite Anodes for High-Energy Lithium Batteries," Energy Technol., 2013, 1 pp. 77-84.

Rock et al., "Synthesis and characterization of electrochemically active graphite-silicon-tin composite anodes for Li-ion applications," Journal of Power Sources 2007, 164, 829-838.

Rosso-Vasic et al., "Alkyl-Functionalized Oxide-Free Silicon Nanoparticles: Synthesis and Optical Properties," Small-Wiley Journal, 2008, vol. 4, Issue 10, pp. 1835-1841.

Ruffo, R., et al., Impedance analysis of silicon nanowire lithium ion battery anodes, The Journal of Physical Chemistry 20909, 113, pp. 11390-11398.

Shuba et al., "The Effect of Powder Mixing Procedures on α-SiAION," Journal of the American Ceramic Society, 2006, 89(3):1110-1113.

Song, T., et al., "Arrays of sealed silicon nanotubes as anodes for lithium ion batteries," Nano Letters 2010, 10, pp. 1710-1716.

Tao et al., "Self-supporting Si/Reduced Graphene Oxide nanocomposite films as anode for lithium ion batteries," Electrochemistry Communications 13, 2011, 1332-1335.

Thakur et al., "Inexpensive method for producing macroporous silicon particles (MPSPs) with pyrolyzed polyacrylonitrile for lithium ion batteries," Scientific Reports, 2012, 2:795, pp. 1-7.

Verdoni et al., "A fractionation process of mechanochemically synthesized blue-green luminescent alkyl-passivated silicon nanoparticles," Chemical Engineering Journal 172, 2011, 591-600.

Wan et al., "Covalent Organic Frameworks with High Charge Carrier Mobility," Chem. Mater. 2011, 23, downloaded from http://yaghi.berkeley.edu/pdfPublications/11-cofhighcharge.pdf, pp. 4094-4097.

Wang et al., "A novel composite containing nanosized silicon and tin as anode material for lithium ion batteries," Electrochimica Acta 2009, 54, 4662-4667.

Wang et al., "A novel nanosized silicon-based composite as anode material for high performance lithium ion batteries," Electrochimica Acta 2011, 56, 1512-1517.

Wang et al., "Development and characterization of a novel silicon-based glassy composite as an anode material for Li-ion batteries," Solid State Ionics 2011, 192, 330-334.

Wang et al., "Self-healing chemistry enables the stable operation of silicon microparticle anodes for high-energy lithium-ion batteries," Nature Chemistry, 2013, vol. 5, pp. 1042-1048.

Xin et al., "A 3D porous architecture of Si/graphene nanocomposite as high-performance anode materials for Li-ion batteries," Journal of Materials Chemistry, 2012, 22, 7724-7730.

Yao, Y. et al., "Interconnected silicon hollow nanospheres for lithium-ion battery anodes with long cycle life," Nano Letters 2011, 11, pp. 2949-2954.

Yen et al., "Sputtered copper coating on silicon/graphite composite anode for lithium ion batteries," Journal of Alloys and Compounds 2014, 598, 184-190.

(56) References Cited

OTHER PUBLICATIONS

Zhang et al., "Interweaved Si@C/CNTs&CNFs composites as anode materials for Li-ion batteries," Journal of Alloys and Compounds 2014, 588, 206-211.
Zhao et al., "In-Plane Vacancy-Enebled High-Power Si-Graphene Composite Electrode for Lithium-Ion Batteries," Advanced Energy Materials, 2011, 1, 1079-1084.
Zhou et al., "Si/TiSi2 Heteronanostructures as High-Capacity Anode Material for Li Ion Batteries," Nano Lett., 2010, vol. 10, pp. 860-863.
Zhou et al., Spin-Coated Silicon Nano-article/Graphene Electrode as a Binder-Free Anode for High-Performance Lithium-Ion Batteries, Nano Res. 2012, 5(12) pp. 845-853.
Zhu et al., "Directing Silicon-Graphene Self-Assembly as a Core/Shell Anode for High-Performance Lithium-Ion Batteries," Langmuir, 2013, 29, 744-749.
Chinese Patent Office Action for Application No. 201780041575.X dated Jul. 14, 2021 (9 pages, statement of relevance included).
European Patent Office Extended Search Report for Application No. 17824762.3 dated Jan. 20, 2020 (8 pages).
U.S. Appl. No. 17/238,005, filed Apr. 22, 2021, by Newbound et al.
U.S. Appl. No. 16/273,329, filed Feb. 12, 2019, by Newbound et al.
International Search Report and Written Opinion for Application No. PCT/US2017/040605 dated Sep. 14, 2017 (11 pages).
International Preliminary Report on Patentability for Application No. PCT/US2017/040605 dated Jan. 17, 2019 (6 pages).

\* cited by examiner

PASSIVATED PRE-LITHIATED MICRON AND SUB-MICRON GROUP IVA PARTICLES AND METHODS OF PREPARATION THEREOF

CROSS-REFERENCE TO RELATED APPLICATIONS

This is application claims priority to U.S. Provisional Patent Application No. 62/358,401 filed Jul. 5, 2016, and U.S. Provisional Patent Application No. 62/479,444 filed Mar. 31, 2017, both of which are incorporated by reference herein in their entirety.

TECHNICAL FIELD

The present disclosure generally relates to the formation of pre-lithiated micron- and sub-micron Group IVA particles, with surface modifiers applied to passivate lithium from reactions with air and moisture, to the formation of artificial SEI (Solid Electrolyte Interphases) in lithium-ion batteries for improved cycle stability and charge capacity retention, and to methods of preparation and energy storage applications thereof.

BACKGROUND OF THE INVENTION

Solid Electrolyte Interphase (SEI) formation on an anode during the first charge-discharge cycle can cause high, irreversible capacity loss (ICL) and result in low Coulombic efficiency. This is the primary fate of depleted lithium, which is in limited supply in a full cell where essentially all of the active lithium is supplied initially from the cathode material, and it accounts for a large part of the ICL.

Typically, nearly all of the lithium used in lithium ion batteries (LIBs) is supplied in its oxidized state as part of the positive electrode (cathode) composite. Supplying lithium in the negative electrode (anode) would require it to be in a reduced state, which is very unstable toward ambient air and, in particular, moisture. Because commercial electrode laminates are typically made from aqueous slurries, pre-lithiation of the active materials in the anode, unless rigorously passivated to avoid reactions with water, has not been successful prior to making the electrode laminate.

Anode pre-lithiation processes have been developed for after the formation of the electrode laminate. For example, R. W. Grant (US 2014/0310951) discloses an electrochemical reduction process, and another approach is compressing stabilized Li powder (SLMP) manufactured by FMC (U.S. Pat. No. 7,588,623) into a cured anode laminate. However, both of these processes are not very adaptable to established industry practices and thus, have not been commercialized.

Other approaches for prelithiation have been published, but none have yet resulted in a viable commercial product or process that could be adapted by LIB manufacturers. There are several stable phases of $Li_xSi$ (where x is about 1 to about 4.25) that could be synthesized thermochemically to make alloys or crystalline phases (herein generally referred to as $Li_xSi_y$ alloy). Some of these alloys (preferably those with crystalline character) have been prepared as powders by mechanical milling. For example, Iwamura, S. et al. (Sci Rep. 5, 8085; DOI:10.1038/srep08085 (2015)) have reported negative electrodes prepared with $Li_{21}Si_5$ alloys by mechanical milling. They assert that $Li_{21}Si_5$ is so reactive that it could not be combined directly with polymer binders without degrading the mixture, unless the alloy was first passivated with carbon. The passivation of $Li_{21}Si_5$ particles by carbon black only prevented severe detrimental reactions with polymer binders; it did not passivate the particles toward reactions with water and air.

Additionally, volume expansion upon lithiation of silicon through the formation of multiple $Li_xSi_y$ phases can reach as high as 400%. This physical property has been the root cause of several detrimental effects that leads to rapid capacity fade upon undergoing multiple charge-discharge cycles. Mechanical stress from volume expansion and contraction during charge/discharge cycles can lead to particle pulverization, loss of electrical contacts, and excessive SEI buildup in the negative electrode composites, with at least 35% of the lithium being consumed in the process. These conditions have impeded commercialization of LIBs with silicon in the anode. For $Li_xSi_y$ to be adaptable to current LIB industry manufacturing processes, a robust passivation barrier must be applied that is capable of preventing hydrolysis when it is immersed in aqueous-based electrode slurries. Ideally, this passivation layer should also function as the SEI layer.

Several approaches have been pursued to manage the effects of volume expansion. It is now generally recognized that limiting at least one dimension of Si structures to about 150 nm or less prevents the occurrence of stress fracturing. However, volume expansion and contraction of nanoparticles still occurs with lithiation/delithiation cycles. Even if Si nanoparticles can be spaced apart from each other to prevent compressive stress fracturing, natural SEI that forms around the lithium-active surfaces is brittle and will continue to fracture, reforming upon electrochemical cycling when active sites are exposed to electrolyte solvents.

The concept of creating an egg-yolk structure, in which the active Si particle resides inside a rigid shell large enough to accommodate the fully expanded $Li_xSi$ particle, while also keeping solvent from coming inside the shell, is exemplified by Cui (U.S. Pat. No. 9,231,243). Flexible hydrocarbon shells and various methods of fabricating pyrolyzed carbon shells have been proposed by others. None of these examples has proven commercially viable due to the complexity of the process scale-up, costs of reagents, or lackluster electrochemical performance.

A prelithiation process asserted by Zhamu et al. (U.S. Pat. No. 8,158,282) to be economically viable involves galvanic charging of the electrode prior to assembling the cells. However, this process has so far not been adapted by the industry. In summary, no commercially viable processes have yet emerged. Thus, there is a need for a prelithation method that can be applied in commercial production lines for negative electrodes.

SUMMARY OF THE INVENTION

Generally disclosed herein are compositions and methods for pre-lithiation of Group IVA micron and sub-micron particles by application of surface-modifiers, such that reactive lithium-M alloy particles (where M may be Si, Ge, or Sn, for example) are substantially passivated to reactions with air and moisture. The disclosed surface modifiers may serve as an artificial SEI barrier and are impermeable to oxygen and water to an extent such that the particles can be dispersed in aqueous-based slurries typically used to form negative electrodes in existing commercial lithium-ion battery processes. Electrode composites made with these pre-lithiated Group IVA particles may exhibit high first-cycle efficiency ("FCE") (FCE; at least about 90%) and high subsequent cycle efficiencies. With lithiation of the active anode materials, apparent irreversible capacity loss (ICL) from the formation cycles may be mitigated, thus preserving lithium from the cathode that would otherwise be consumed by SEI formation, in addition to the amount that becomes trapped in the Group IVA particles. (First cycle efficiency, expressed in percent (%), defines the ratio of charge that can be accommodated by the anode vs the charge that can be delivered by the anode. The lithium consumed by forming the first SEI deposits in the anode during the first charge/discharge cycle usually accounts for most of the first cycle irreversible capacity loss (ICL). FCE+ICL=100%) Additionally, volume expansion of the Group IVA particles has already taken place, thus reducing the severity of volume expansion during the initial charge/discharge cycles. The composition of the passivated pre-lithiated particles and the processes described herein may provide a means of seamless integration of these materials in existing industry electrode manufacturing processes.

In one embodiment, the invention provides a method of producing a negative electrode, including comminuting Li-Group IVA alloy particles in a solvent to a desired particle size distribution range, exposing surfaces of the Li-Group IVA alloy particles to at least one surface modifier present during the comminution process, the at least one surface modifier forming at least one continuous coating on at least one of the exposed surfaces of the Li-Group IVA alloy particles, removing the solvent, and adding the surface-modified Li-Group IVA alloy particles to a negative electrode material by a coating process.

Other aspects of the invention will become apparent by consideration of the detailed description and accompanying drawings.

DETAILED DESCRIPTION

Figure 1:
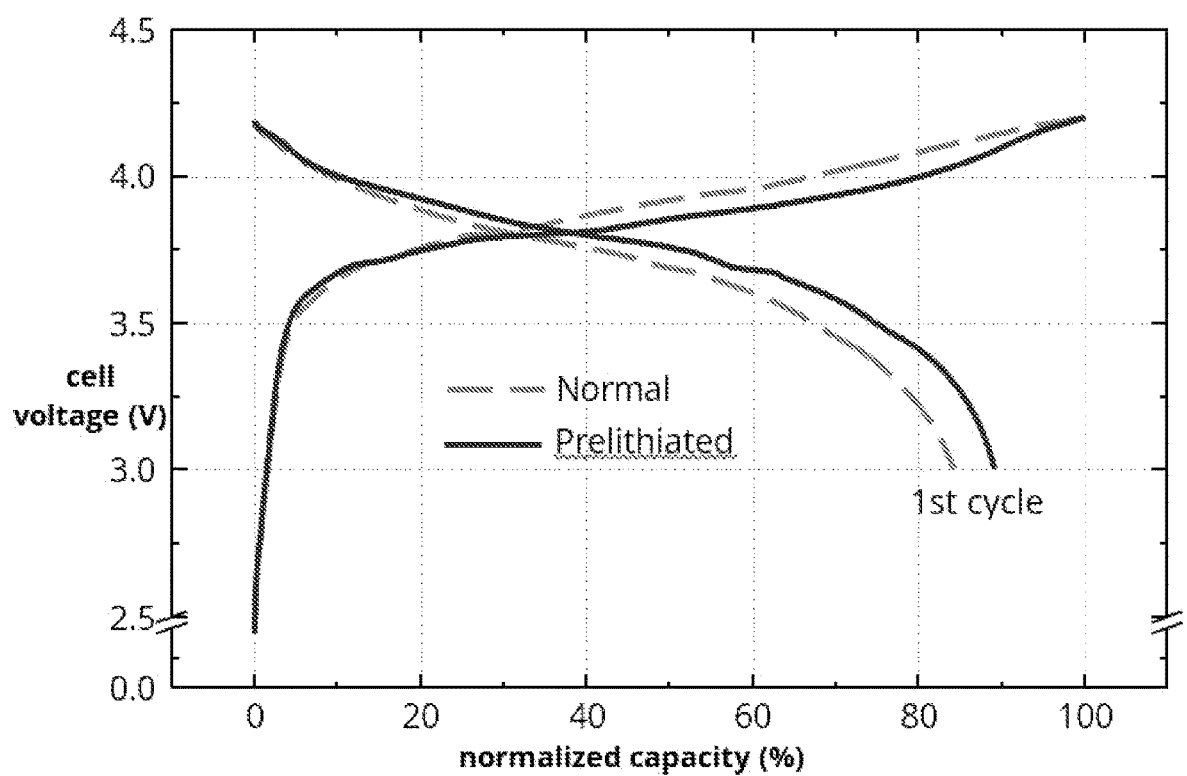
FIG. 1 shows a first charge-discharge plot comparison between prelithiated laminate (green) and non-prelithiated laminate (blue). The First Cycle Efficiency (FCE) without prelithiation is about 83.5%, whereas with prelithiation the FCE is about 90%. It can be made to be about 100% with added prelithiated surface-modified silicon.
Figure 2:
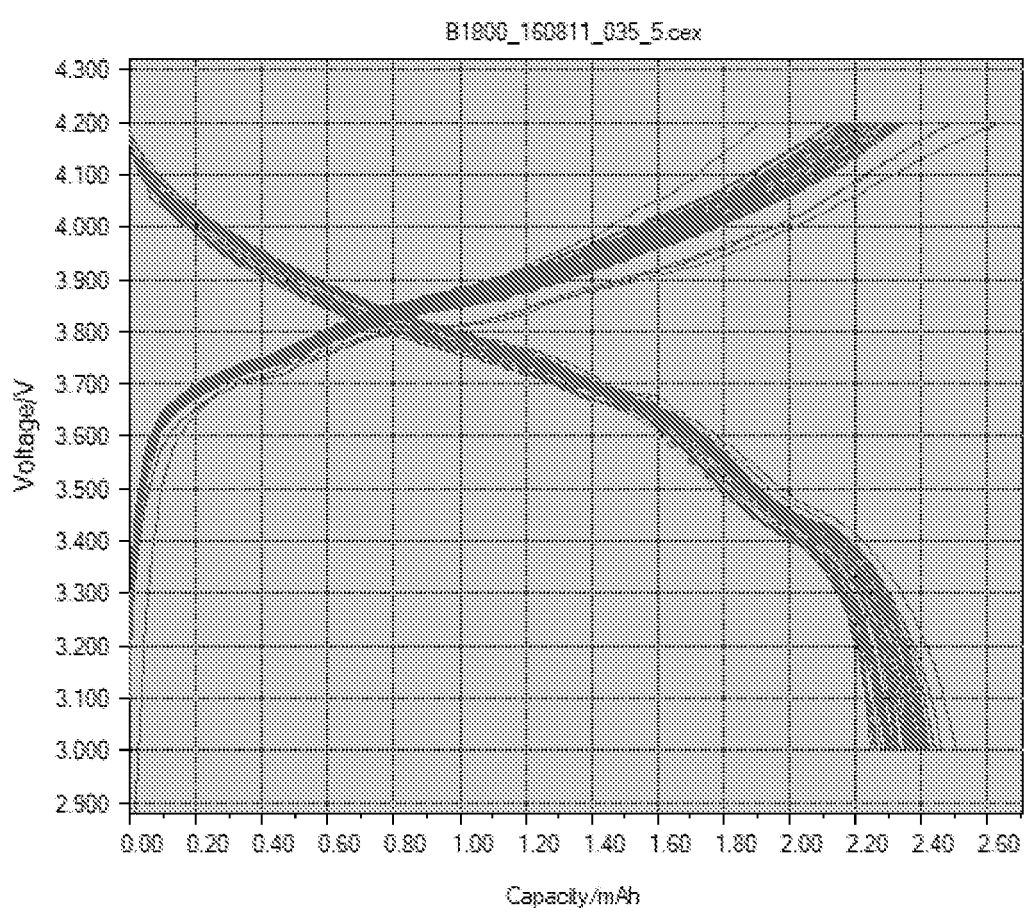
FIG. 2 shows the first 50 charge-discharge cycles after the formation cycle (FCE about 88.5%) full cell with Nickel/Cobalt/Alumina (NCA) cathode. The anode/cathode ratio is about 1.1.
Figure 3:
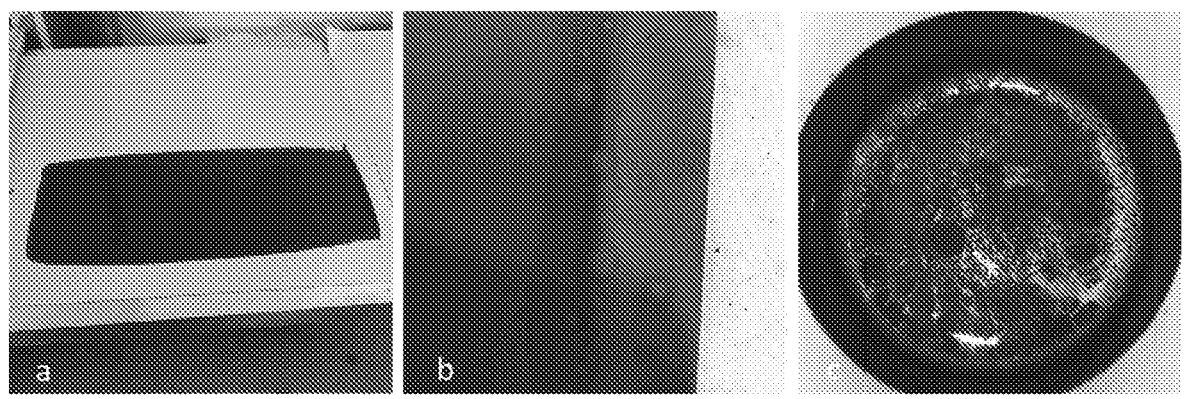
FIG. 3 shows images of laminate made in aqueous binder. (a) About 5% prelithiated surface-modified silicon with protected shell. (b) About 5% prelithiated surface-modified silicon with non-protected shell. (c) Slurry of about 5% prelithiated Si with non-protected shell. Comparing the panels shows the stability of prelithiated surface-modified silicon product in aqueous binder.
Figure 4:
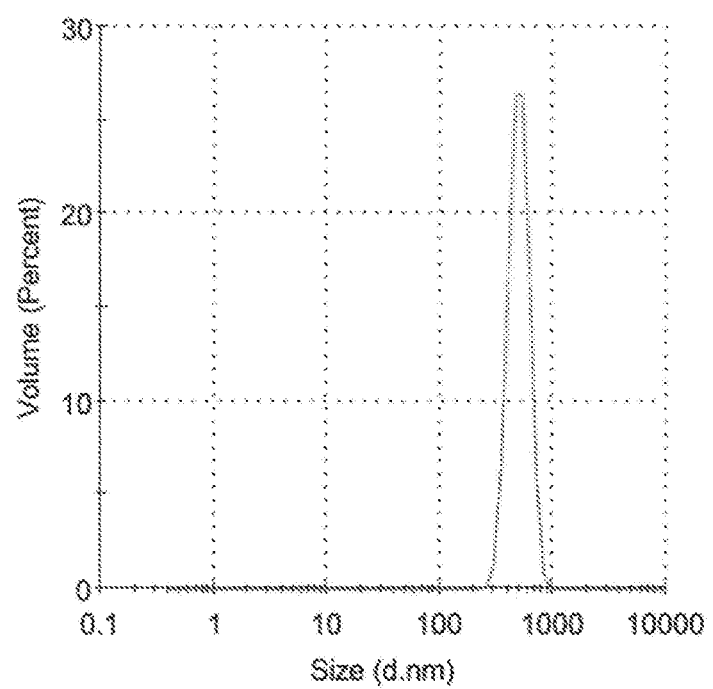
FIG. 4 shows a plot of the non-spherical particle size distributions (PSD) of prelithiated surface-modified silicon. $D_{50}$ is about 500 nm, and the PSD is narrow. PSD is measured using dynamic light scattering (DLS) particle size analysis is based on Brownian motion light scattering.
Figure 5:
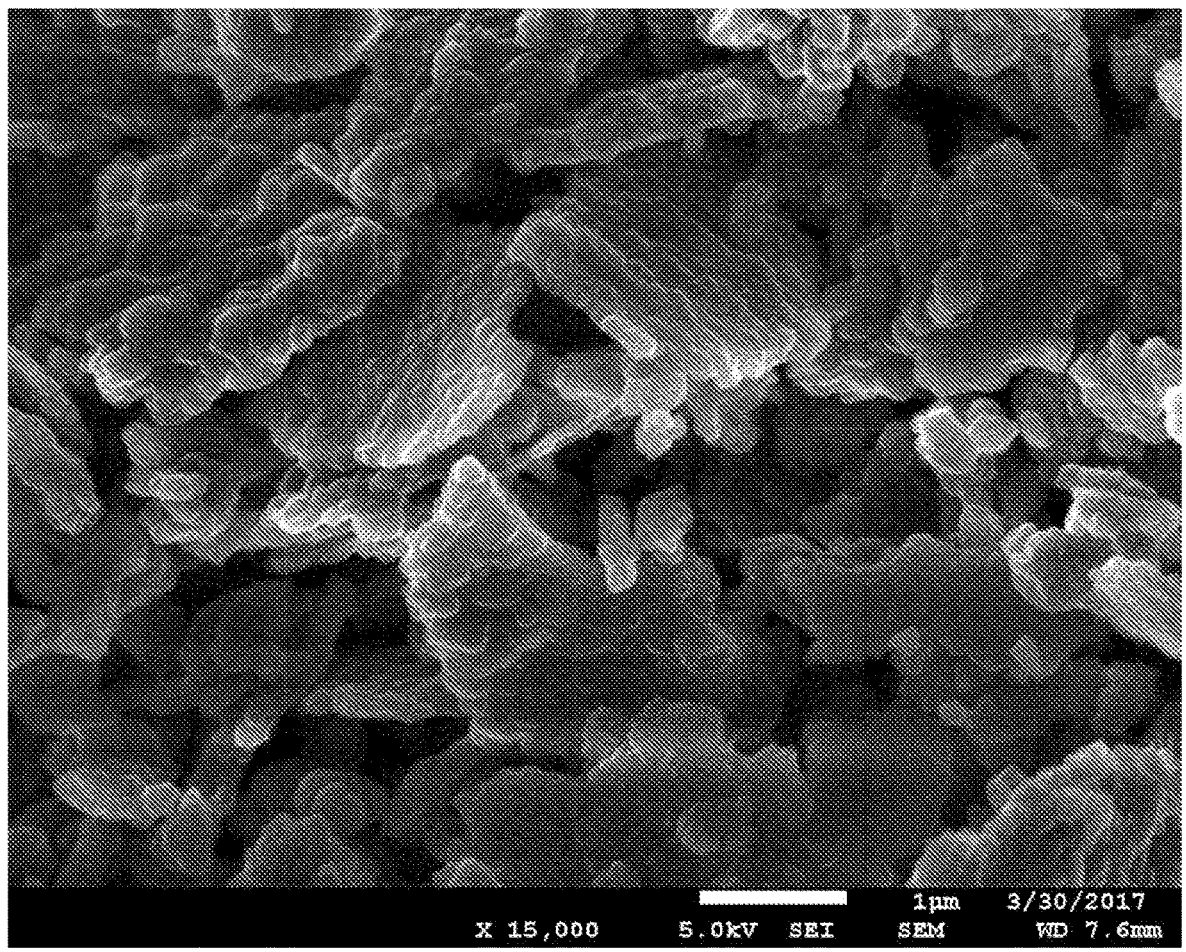
FIG. 5 shows an SEM image of the non-spherical surface-modified silicon represented in FIG. 3.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

The inventors of the present application have previously developed a flexible, scalable process (U.S. Pat. No. 9,461,304 incorporated herein by reference) to produce sub-micron surface-modified particles of Group IVA elements (U.S. Pat. No. 9,461,309 incorporated herein by reference). By employing this general process, it is possible to produce micron or sub-micron $Li_xSi_y$ alloy particles encased with an inactive protective shell. This protective shell may function much like an artificial SEI layer.

The inactive protective shell allows safe handling of $Li_xSi_y$ alloy particles in air and aqueous environments. Without this protective shell, Li metal reacts exothermically with water and both Li and Si will quickly oxidize in air to form an oxide shell. While an oxide shell impedes the diffusion of oxygen to the reactive $Li_xSi_y$ alloy core, it is insufficient to prevent water from reacting violently with $Li_xSi_y$ alloy. By applying a continuous inactive protective shell that impedes the diffusion of water, the passivated $Li_xSi_y$ alloy particles can be combined with binders and other components of the anode composite in common commercial slurry production processes used in conventional LIB manufacturing.

The coated $Li_xSi_y$ alloy may increase the cycle stability of the LIB. Si and other Group IVA elements are known to undergo large volume expansion during lithiation/delithiation (i.e. cycling). The volume expansion causes physical break down of the SEI, which leads to capacity loss as Li is consumed to form new SEI. However, the shell may be inactive and may not undergo significant volume change during cycling. Consequently, much less Li is consumed during lithiation and delithiation, leading to higher overall Columbic efficiencies and cycle life.

This disclosure describes, among other things, how to produce coated $Li_xSi_y$ alloys designed to enhance the performance of LIB negative electrodes. It should be understood that Ge and Sn or some combination of Si, Ge, and Sn could also be used to form alloys with Li that would function similarly as components of LIB negative electrodes. There are several possible methods in which these materials can be combined to create a composite material with the attributes of each component while also gaining synergies that the individual components lack by themselves. Examples used in the following discussion are intended to be non-limiting with respect to the reagents used in the examples.

In the present disclosure, methods of producing micron or submicron scale $Li_xSi_y$ alloy with an inactive coating are described. The methods described herein use a $Li_xSi_y$ alloy as the feedstock for comminution in alkane or cycloalkane solvents, such as hexanes, heptanes, octanes, cyclohexanes, or any saturated alkane solvents. Other Li alloys can also be used with the methods of the present invention, including LiGe, LiSn, or other combinations of Si, Ge, and Sn with Li to form an alloy, for example. One exemplary alloy is $Li_{15}Si_4$. Depending on the desired particle size distribution (PSD) range of the $Li_xSi_y$ alloy product, comminution conditions can be chosen from a combination of parameters that one skilled in the art of comminution will be able to select. Any suitable method of comminution may be used in the process of the present invention, including, but not limited to, milling, wet milling, crushing, grinding, cutting, vibrating, or other processes. If a milling process is used, agitator speeds and other conditions during comminution are chosen depending on the size of the mill, batch size, bead selection, solids loading, solvent selection circulation rate, and secondary reagents employed.

For example, in some embodiments, $Li_xSi_y$ alloy is comminuted by a circulating bead mill in an alkane solvent (including, but not limited to, cycloalkane solvents, hexanes, heptanes, octanes, cyclohexanes, or any saturated alkane solvents) with a polymer additive (including, but not limited, to polystyrene, polyacrylonitrile, polyacrylic acid (and its neutral Li salt), and polyaniline). Alternately or additionally, polymer coatings may be added post-milling on top of $Li_xSi_y$ alloy particles with any surface coatings that were applied during comminution processing.

The $Li_xSi_y$ alloy particle size distribution is reduced to the desired PSD range by comminution, preferably about 1,000-44,000 nm, or more preferably about 50-1,000 nm, and more preferably between about 400-600 nm. Highly reactive surfaces of the $Li_xSi_y$ alloy that are exposed on the fractured $Li_xSi_y$ alloy particles will form covalent bonds to the polymer and any desired surface modifiers present during the comminution process. The polymer and co-reagents form a continuous coating (protective shell) on the $Li_xSi_y$ alloy particles, covering all surfaces with an at least 2 nm to about 500 nm layer. The polymer coating may be thermally processed or crosslinked with added reagents, all part of the protective shell. The milling solvent is then removed by an evaporation process. This could be done by any number of methods known in the art, such as spray drying or evaporation under reduced pressure in a suitable atmosphere. Optionally, the particle can be heated, for example, to about 150-1200° C. for about 30 minutes to about 24 hours under a suitable gas (including, but not limited to, air, Ar, or $Ar/H_2$) or in a vacuum to cure the protective shell. Curing is considered to be partial to complete cross-linking of polymer precursors or carbonization of the hydrocarbon mass on the $Li_xSi_y$ alloy surfaces. Heating temperatures and durations will depend on what polymer coatings are used to form a protective shell. The resulting coated $Li_xSi_y$ alloy material can then added to a conventional LIBs negative electrode composite using conventional coating processes (including, but not limited to, the addition of carbon black, graphite, or other additives used with aqueous binder systems in conventional anode slurries, or non-aqueous binder systems, such as NMP/PVdF).

In one non-limiting example, 325-mesh $Li_{15}Si_4$ (about 48:52 wt %) was prepared thermochemically as the feedstock for wet milling processes in alkane or cycloalkane solvents, such as hexanes, heptanes, octanes, cyclohexanes, or any saturated alkane solvents with a boiling range well above the operation temperature of the milling slurry (typically between about 25-60° C.). Depending on the desired PSD range of the $Li_xSi_y$ alloy product, comminution conditions can be determined. Milling beads and materials are typically selected from hard ceramic materials. Beads range in diameter from about 100-1,000 microns, preferably about 300-900 microns. The agitator tip-speeds during comminution are typically running between about 2-15 m/s for about 15-1200 minutes, depending on the size of the mill, batch size, bead selection, solids loading, solvent selection circulation rate, and secondary reagents employed.

In another non-limiting example, $Li_{15}Si_4$ alloy was stirred under Ar for about 48 hours in an about 5% polyacrylonitrile (PAN) solution in dimethylsulfoxide (DMSO). The weight equivalent ratio of $Li_xSi_y$ to PAN was about 7:3. The DMSO was stripped by vacuum distillation, and the remaining solids were dried for about 6 hours under dynamic vacuum at about 80° C. The remaining solid was heated for about 2 hours under Ar atmosphere to cure the protective coating. In an alternate embodiment, dimethylformamide (DMF) is used as the solvent in place of DMSO.

In some embodiments, monomeric surface modifiers may be added in place of or in addition to polymers. The surface modifiers may be monomers with functional groups that react with the $Li_xSi_y$ alloy particle surfaces or with the polymer to form chemical bonds. Because $Li_xSi_y$ alloy is so reactive, almost any organic compound with heteroatoms and/or unsaturated bonds are potential surface modifiers. Reactive monomers could be selected from the group consisting of alkenes, alkynes, aromatics, heteroaromatics, cycloalkenes, alcohols, glycols, polyglycols, ethers, polyethers, thiols, disulfides, amines, amides, pyridines, pyrroles, imides, imidazoles, imidazoline, furans, thiophenes, cyanates, isocyanates, isothiocyanates, ketones, carboxylic acids, esters, amino acids, aldehydes, acrylates, methacrylates, oxylates, organic carbonates, lactones, and gases, such as $H_2$, $O_2$, $CO_2$, $N_2O$, and HF. Various fluorinated analogs of these compounds can also be used, such as trifluoroacetone, bis(2,2,2-trifluoroethyl) carbonate, 2,2,2-trifluoroethyl acrylate, 2,2,2-trifluoroethyl methacrylate, and 1,3,5-trifluorobenzene. The comminution solvent is then removed by any suitable method, and the coated $Li_xSi_y$ alloy particle may or may not require heating under a suitable gas to cure the coating and form a protective shell. This protective shell may prevent water or other solvents used to combine elements of the electrode coating process from reacting with the $Li_xSi_y$ core material. This coated $Li_xSi_y$ alloy can be added to conventional LIBs negative electrode composite using conventional coating processes.

Table 1 below shows several mass equivalents of reagents used for comminution, compared with product yields of comminution process and heat processing steps. Table 1 (supplemented by the drawings) demonstrates composition of matter of products after comminution and after heat treatment, as well as the processes disclosed herein.

TABLE 1

| Reagents | Reagent Mass Equivalent | Mass Yield Equivalent | Mass Equivalent after heat treatment |
|---|---|---|---|
| $Li_{15}Si_4$ | 4 | 13 | 13 |
| M(i-OPr)$_4$ | 1 | | |
| Alkane | 400 | | |
| $Li_{15}Si_4$ | 4 | 7 | 7 |
| Polyether | 1 | | |
| Alkane | 400 | | |

In some embodiments, the $Li_xSi_y$ alloy is comminuted in an inert alkane solvent in the presence of a metal-oxide or a metal-alkoxide reagent. Some examples of metal oxides are $Al_2O_3$, $TiO_2$, $Li_4Ti_5O_{12}$, MgO, NiO, and borates. Metal alkoxides constitute an important class of compounds often used in sol-gel processes. They are characterized by a metal-oxygen-carbon bonding system, including such metals as magnesium, aluminum, titanium, zinc, or lithium. Metal alkoxides in particular have proven to be especially beneficial during comminution as they modify particle surfaces to keep particles well suspended in the slurry with alkane solvents. If required, subsequent curing of the coated $Li_xSi_y$ particles will form a protective shell comprised of metal oxides that sufficiently impedes ingress of solvents to the $Li_xSi_y$ alloy particle core.

In some embodiments, inorganic carbon (non-hydrocarbon) surface modifiers can be added at some stage during or following comminution of $Li_xSi_y$ alloy and allowed to contact and form covalent bonds on highly reactive sites on newly fractured surfaces of the $Li_xSi_y$ alloy particles. For example, the surface modifiers can be present at the beginning of the comminution process, or added after most of the particle size reduction has taken place but while surfaces are still very reactive (while there are many non-passivated sites). The progress of the comminution can be monitored by particle size distribution measurements and/or by monitoring slurry temperatures, viscosity, or power input. Inorganic carbon surface modifiers may be comprised from the group: carbon nanotubes (SWCNT, MWCNT), nanospherical carbon, fullerenes, graphene, graphite, or carbon black. Optionally, other hydrocarbons (monomers or polymers) may be added to help provide complete coverage of the $Li_xSi_y$ particle surface and provide passivation of the $Li_xSi_y$ alloy core from reactive solvents.

In some embodiments, the coated $Li_xSi_y$ alloy particles are blended with natural flake graphite (NFG). Prolonged blending of these dry powders under inert atmosphere can imbed sub-micron $Li_xSi_y$ alloy particles into surface pores and crevices of NFG particles (typically about 10-20 micron). Subsequent coating of the NFG particles with a polymer or polymer precursors to provide a continuous coating on the NFG and over imbedded $Li_xSi_y$ particles is a means of passivating the $Li_xSi_y$ alloy while also spacing the $Li_xSi_y$ particles in a Li-active matrix that will tolerate the expansion and contraction of $Li_xSi_y$ alloys without breaking critical covalent bonds with its surrounding framework. Subsequent heat treatment may be required, particularly for polymer precursors to form cross-linked covalent bonds that impart added strength to the electrode composite.

In some embodiments, the $Li_xSi_y$ alloy is comminuted in an inert alkane solvent in the presence of hydrogen, which serves as a forming gas. A forming gas is an industrial gas comprised of inert gas blended with typically about 5% $H_2$ or less. Forming gas can be used in the place of purified argon to blanket the slurry during comminution. Molecular hydrogen is reactive toward silicon surfaces. It can also and will migrate into silicon and other metals as atomic hydrogen and will form LiH on the surface of $Li_xSi_y$ alloy particles. $H_2$ is also known to cap (passivate) Si surfaces by forming Si—H bonds with "dangling" Si—Si bonds created from fracturing Si particles. This condition may be preferred when it is desired to produce $Li_xSi_y$ alloy particles with no oxides.

In some embodiments, comminution of $Li_xSi_y$ alloy produces submicron or nanoparticle distributions (preferably about 44,000-1,000 nm, or more preferably about 50-1,000 nm, and more preferably between about 400-600 nm). Surface modifiers may be applied to the particles, which induces aggregation of the nanoparticles into micron-sized clusters. Grain structure in the micron-sized clusters is created from the coatings on the nanoparticles. These coatings can be heat-processed (cured) to form tight, porous covalently bonded masses of carbon and metal oxides in grains between the $Li_xSi_y$ alloy core nanocrystals. The same coating that resides in grains between the $Li_xSi_y$ alloy nanocrystals form a continuous protective shell around the micron-sized cluster that impedes ingress of solvents, but allows $Li^+$ ion mobility and facilitates electrical charge transfer from the $Li_xSi_y$ alloy particle core to the electrode current collector. The surface modifiers used in this process of making aggregated $Li_xSi_y$ alloy clusters could be any of the organic reagents, metal oxides, or metal alkoxides disclosed herein.

In some embodiments, Li salts (for example from the group LiF, $Li_2O_2$, $Li_2CO_3$, $LiBF_2(C_2O_4)$, $Li_2(C_2O_4)$) can be added during comminution of $Li_xSi_y$ alloy alone or with other surface modifiers, which can be heat processed and cured as described above to form a protective shell from a covalently bonded continuous layer of the additives that impedes ingress of solvents, but will allow $Li^+$ ion mobility and will facilitate electrical charge transfer from the particle $Li_xSi_y$ alloy core to the electrode current collector.

In some embodiments, Li- or Na-organic complexes may be used with any source of Li-active Group IVA elements (e.g., solar grade Si or Ge wafer kerf or metallurgical silicon) to prepare Group IVA particles with partial insertion (prepared in-situ and added during the comminution process) of the alkali metals. For example, polycyclic aromatic (PA) compounds, such as pyrene, perylene, and naphthalene, form ion-paired $Li^+PA^-$ complexes that can deliver Li to the Group IVA particle during comminution.

The $Li^+PA^-$ complexes described above can also function as an electrolyte in an appropriate solvent (such as gamma butyrolactone) whereupon a current is applied to a cell with Li foil as the counter electrode and with a Si/graphite electrode laminated on a Cu current collector as the working electrode. The Si particles in the Si/graphite electrode will undergo Li insertion. This electrode laminate is then partially charged with Li and can be used to make a battery with a partially charged negative electrode.

The modifier "about" used in connection with a quantity is inclusive of the stated value and has the meaning dictated by the context (for example, it includes at least the degree of error associated with the measurement of the particular quantity). The modifier "about" should also be considered as disclosing the range defined by the absolute values of the two endpoints. For example, the expression "from about 2 to about 4" also discloses the range "from 2 to 4". The term "about" may refer to plus or minus 10% of the indicated number. For example, "about 10%" may indicate a range of 9% to 11%, and "about 1%" may mean from 0.9-1.1. Other meanings of "about" may be apparent from the context, such as rounding off, so, for example "about 1" may also mean from 0.5 to 1.4.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

Thus, the invention provides, among other things, a method of producing a negative electrode. Various features and advantages of the invention are set forth in the following claims.

What is claimed is:

1. A method of producing a negative electrode, the method comprising:
   comminuting Li Group IVA alloy particles in a solvent to a particle size distribution range of about 50 to about 1,000 nm;
   exposing surfaces of the Li Group IVA alloy particles to at least one surface modifier present during the comminution process,
      wherein the at least one surface modifier comprises a Li salt selected from the group consisting of LiF and $Li_2CO_3$,
      wherein the at least one surface modifier forms at least one continuous coating on at least one of the surfaces of the Li Group IVA alloy particles;
   removing the solvent; and
   adding the surface-modified Li Group IVA alloy particles to a negative electrode material by a coating process.

2. The method according to claim 1, wherein comminuting includes using a circulating bead mill.

3. The method according to claim 2, wherein the milling bead is a hard ceramic material having a diameter from about 500 microns to about 700 microns.

4. The method according to claim 3, wherein an agitator tip-speed during comminuting is about 12.5 m/s for about 5 hours.

5. The method according to claim 1, wherein the solvent is selected from the group consisting of cycloalkanes, hexanes, heptanes, octanes, cyclohexanes, and any other saturated alkane.

6. The method according to claim 1, wherein the at least one surface modifier comprises a monomer additive or a polymer additive,
wherein the monomer additive is selected from the group consisting of alkenes, alkynes, aromatics, heteroaromatics, cycloalkenes, alcohols, glycols, polyglycols, ethers, polyethers, thiols, disulfides, amines, amides, pyridines, pyrroles, imides, imidazoles, imidazoline, furans, thiophenes, cyanates, isocyanates, isothiocyanates, ketones, carboxylic acids, esters, amino acids, aldehydes, acrylates, methacrylates, oxylates, organic carbonates, lactones, and the gases $H_2$, $O_2$, $CO_2$, $N_2O$, and HF, and fluorinated analogs thereof when applicable; and
wherein the polymer additive is selected from the group consisting of polystyrene, polyacrylonitrile, polyacrylic acid, lithium polyacrylate, and polyaniline,
wherein the polymer additive covalently bonds directly to at least one of the surfaces of the Li Group IVA particles.

7. The method according to claim 1, wherein the at least one surface modifier comprises a metal-oxide or a metal-alkoxide;
wherein the metal-oxide is selected from the group consisting of $Al_2O_3$, $TiO_2$, $Li_4Ti_5O_{12}$, MgO, NiO, and borates; and
wherein the metal-alkoxide is selected from the group consisting of magnesium alkoxides, aluminum alkoxides, titanium alkoxides, zinc alkoxides, and lithium alkoxides.

8. The method according to claim 1, wherein the at least one surface modifier comprises an inorganic carbon surface modifier selected from the group consisting of single-walled carbon nanotubes (SWCN), multi-walled carbon nanotubes (MWCN), nanospherical carbon, fullerenes, graphene, graphite, and carbon black.

9. The method according to claim 1, wherein the continuous coatings form protective shells capable of impeding diffusion of oxygen and/or water to cores of the Li Group IVA alloy particles, wherein the continuous coatings are capable of allowing $Li^+$ ion mobility and/or facilitate electrical charge transfer from the Li Group IVA alloy particles to an electrode current collector; and
wherein the continuous coatings cover the surfaces of the Li Group IVA particles with layers greater than or equal to about 2 nm and less than or equal to about 500 nm thick.

10. The method according to claim 1, wherein removing the solvent includes an evaporation process performed by spray drying and/or evaporation under reduced pressure in a suitable atmosphere.

11. The method according to claim 10, further comprising:
after exposing surfaces of the Li Group IVA alloy particles to at least one surface modifier, heating the Li Group IVA alloy particles at about 150° C. to about 1200° C. for about 30 minutes to about 24 hours under the suitable atmosphere,
wherein the suitable atmosphere comprises air, Ar, Ar/$H_2$, and/or vacuum.

12. The method according to claim 1, wherein a Li-organic complex or a Na-organic complex delivers Li to a silicon particle during comminution to form at least one of the Li Group IVA alloy particles; and
wherein the Li-organic or the Na-organic complex is a polycyclic aromatic compound selected from the group consisting of pyrene, perylene, and naphthalene.

13. The method according to claim 12, further comprising:
applying a current with Li foil as a counter-electrode and with a Si/graphite electrode laminated on a Cu current collector as a working electrode, wherein the polycyclic aromatic compound functions as an electrolyte and the laminate becomes partially charged with Li.

14. The method according to claim 1, wherein at least one of the Li Group IVA alloy particles is formed during comminuting from Li-active solar grade Si wafer kerf, and/or Li-active metallurgical silicon.

15. The method according to claim 1, further comprising:
incorporating the negative electrode material into a slurry production process for producing a negative electrode for a battery.

16. The method according to claim 1, wherein the at least one continuous coating comprising the polymer surface modifier is thermally processed or crosslinked with a reagent; and
wherein the reagent is a monomer additive selected from the group consisting of alkenes, alkynes, aromatics, heteroaromatics, cycloalkenes, alcohols, glycols, polyglycols, ethers, polyethers, thiols, disulfides, amines, amides, pyridines, pyrroles, imides, imidazoles, imidazoline, furans, thiophenes, cyanates, isocyanates, isothiocyanates, ketones, carboxylic acids, esters, amino acids, aldehydes, acrylates, methacrylates, oxylates, organic carbonates, lactones, and the gases $H_2$, $O_2$, $CO_2$, $N_2O$, HF, and fluorinated analogs thereof when applicable.

* * * * *